United States Patent [19]
Shuter et al.

[11] Patent Number: 5,650,880
[45] Date of Patent: Jul. 22, 1997

[54] FERRO-FLUID MIRROR WITH SHAPE DETERMINED IN PART BY AN INHOMOGENEOUS MAGNETIC FIELD

[75] Inventors: William L. H. Shuter, deceased, late of Vancouver, by Beverly Robin Shuter, executrix; Lorne A. Whitehead, Vancouver, both of Canada

[73] Assignee: The University of British Columbia, Vancouver, Canada

[21] Appl. No.: 409,652

[22] Filed: Mar. 24, 1995

[51] Int. Cl.$^6$ .................................................. G02B 5/08
[52] U.S. Cl. ........................... 359/846; 359/838; 359/849
[58] Field of Search ................................. 359/846, 838, 359/847, 849, 858, 859

[56] References Cited

U.S. PATENT DOCUMENTS

| 4,076,387 | 2/1978 | Haas et al. | 359/296 |
| 4,905,517 | 3/1990 | Crowe et al. | 73/654 |

FOREIGN PATENT DOCUMENTS

| 1534417 | 1/1990 | U.S.S.R. | 359/846 |
| 2247323 | 2/1992 | United Kingdom | 359/846 |

OTHER PUBLICATIONS

Borra, et al. "Liquid Mirrors: Optical Shop Tests and Contributions to the Technology," Astrophysical Journal, vol. 393, pp. 829–847, 10 Jul. 1992.

Borra, et al, "Optical Shop Tests of a f/2 1.5 Meter Diameter Liquid Mirror", Astrophysical Journal, vol. 418, Dec. 1993, pp. 943–946.

Shuter, et al., "A Wide Sky Coverage Ferrofluid Mercury Telescope", Astrophysical Journal, vol. 424, 1 Apr. 1994, pp. L139–L141.

Research Disclosure 31516, Anonymous, "Continuously Focusable Mirror", Kenneth Mason Pub. Ltd., Hampshire, England, #315, Jul. 1990.

R. W. Wood, "The Mercury Paraboloid as a Reflecting Telescope", The Astrophysical Journal, vol. 29, 1909, pp. 164–176.

E. F. Borra, "The Liquid–Mirror Telescope as a Viable Astronomical Tool", J. Roy. Astronomical Soc. Can., vol. 76, No. 4 1982, pp. 245–256.

Borra, et al., "A Diffraction–Limited f/2 1.5 Meter Diameter Liquid Mirror," Astrophysical Journal, vol. 346, 1 Nov. 89, pp. L41–L44.

*Primary Examiner*—Paul M. Dzierzynski
*Assistant Examiner*—John Juba, Jr.
*Attorney, Agent, or Firm*—Oyen Wiggs Green & Mutala

[57] ABSTRACT

A controllable optical mirror system incorporating a ferro-fluid having a surface which acquires an equilibrium shape in response to a gravitational field, rotational motion, and applied magnetic fields. The magnetic field has a predetermined spatial variation which produces an advantageous optical shape in the ferro-fluid surface.

2 Claims, 2 Drawing Sheets

FERRO-FLUID MIRROR WITH SHAPE DETERMINED IN PART BY AN INHOMOGENEOUS MAGNETIC FIELD

FIELD OF THE INVENTION

This application pertains to an optical mirror system in which the surface of a ferro-fluid mirror is shaped by gravitational, rotational, and applied magnetic forces to yield a selected optical shape.

BACKGROUND OF THE INVENTION

For centuries, it has been known that the surface of a liquid in gravitational fields can have a high optical quality shape. In order for this to be the case, the surface must be free of surface excitations which can result from vibration and air motion.

More recently, Wood recognized the possibility of creating parabolic mirrors by rotating liquids in a gravitational field (see Wood, R. W. 1909, ApJ, 29, 164). After the liquid has achieved a uniform angular velocity, in the absence of wind, its surface in a uniform gravitational field is a perfect paraboloid. Wood showed that if the liquid is mercury, it is in principle possible to produce mirrors of optical quality at low cost. The problems that Wood encountered in such devices, namely waves and ripples in the mercury surface resulting from inadequate rotational speed control and vibrations introduced by the rotor bearing, have been addressed by Borra and his collaborators (see Borra, E. F., 1983, JPASC, 76, 245; Borra et al, 1989, ApJ, 346, L41; Borra et al, 1992, ApJ, 389, 829; and, Borra et al, 1993, ApJ, 418, 943). Basically, Borra et al used higher quality bearings and high quality drive mechanisms to eliminate such vibrations. Further improvements were obtained by using a very thin layer of mercury in order to increase damping of any surface ripples.

Although mirrors formed by fluid surfaces in gravitational fields are seen to have many potential uses because of their low cost, they do have one major restriction—namely that they must be predominately horizontal. In other words, a vector perpendicular to the center of the mirror must be vertical, regardless of whether the mirror is flat or curved by rotational affects. The present invention addresses this deficiency.

SUMMARY OF THE INVENTION

In the invention described here, the liquid used to form a mirror surface is replaced with a ferro-fluid, which is a liquid containing a suspension of fine ferromagnetic particles, each of which constitutes a single magnetic domain whose orientation in an applied magnetic field is determined by Boltzmann statistics such that the macroscopic behaviour of the suspension is superparamagnetic. In other words, the net magnetization of the fluid is proportional to and in the direction of the magnetic field, yielding a relative magnetization $\mu_r$ which is greater than that of free space. For typical paramagnetic materials $(\mu_r-1)<10^{-5}$, but for ferro-fluids $\mu_r-1$ can be as large as 0.2, over ten thousand times greater. This makes it possible for a magnetic field to have a substantial effect on the position of the ferro-fluid surface, and the fact that the magnetic response of the ferro-fluid is linear allows for it to be precisely controlled and predicted.

According to the invention, one first determines the nature of the displacement one would like to create on the ferro-fluid surface. Normally, the ferro-fluid is initially at an equilibrium position in a gravitational field, or in a combination of a gravitational field and a rotational motion which yields a paraboloidal shape. Generally, it is desirable to make changes in the surface which are of order a few hundred or a few thousand wavelengths, so that a readily available level of precision in the magnetic field can result in surface errors which are smaller than a wavelength of light. A variety of methods for controlling the spatial variation of the magnetic field are possible, most involving coils of specific designs.

In one embodiment, it is advantageous to convert the paraboloidal shape of the rotating liquid mirror to a spherical shape. This small change in shape allows a much wider field of view for certain telescope designs, thus representing a large improvement in the practical utilization of such current mirrors.

Other applications can be made of the invention, enabling a variety of useful optical designs to be achieved.

DETAILED DESCRIPTION OF THE PREFERRED EMBODIMENT

Figure 1:
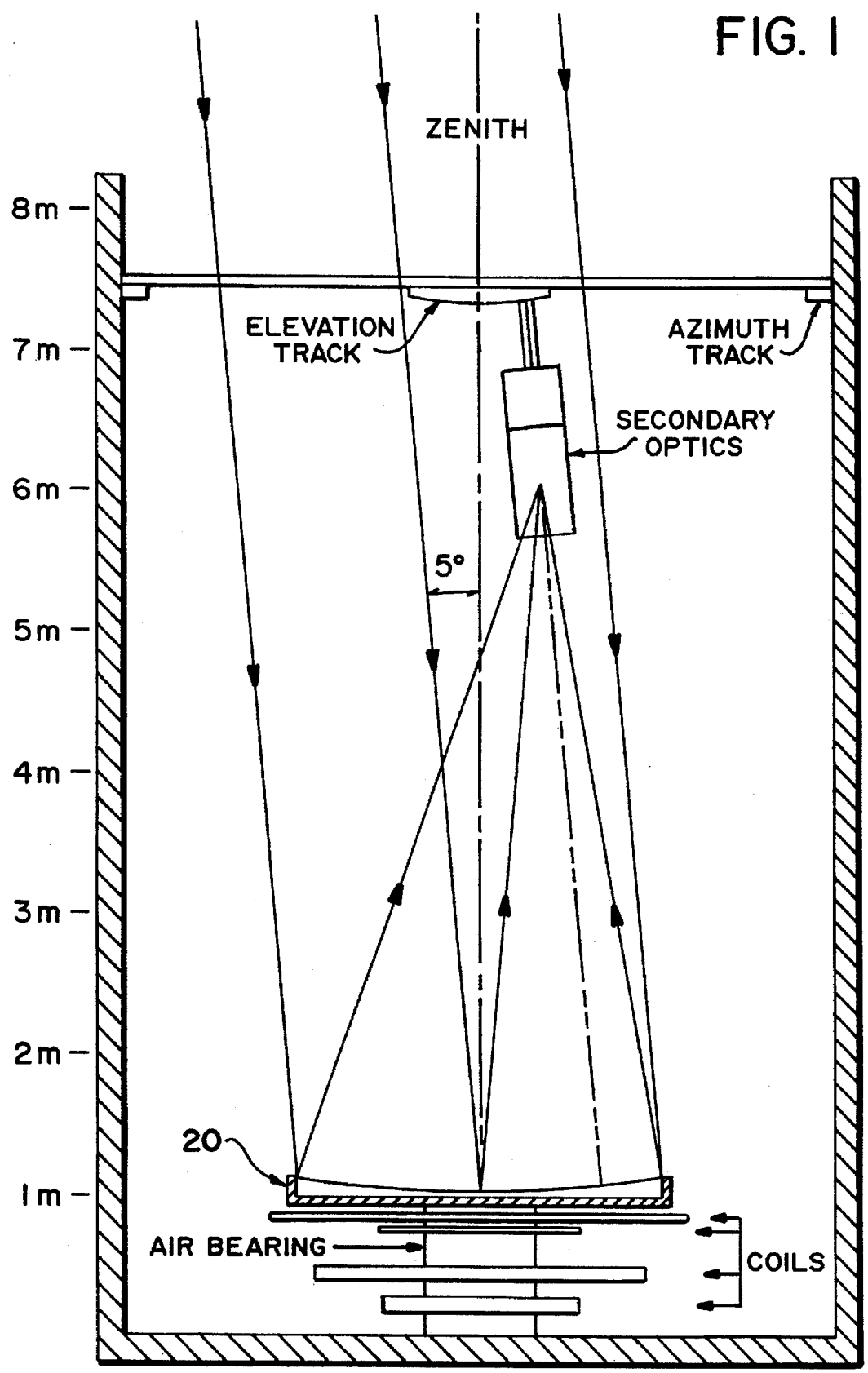
FIG. 1 depicts an exemplary layout for a telescope having a 2.65 m diameter f/1.9 spherical ferro-fluid mercury mirror, showing four coils each having a selected radius and located a selected vertical distance below the mirror to produce a magnetic field of predetermined spatial variation which alters the mirror's shape in an optically advantageous way.

The present invention facilitates design of a system for reshaping an existing astronomical mercury mirror telescope having a 1.325 m radius and 5.00 m focal length, into a spherical surface of adequate precision for optical astronomy. The design process consists of determining the radius, vertical distance below the mirror, and the electrical current for a small number of circular coils, coaxial with the paraboloid axis. The magnitude of the resultant field produced by the coils is required to have the correct profile, as a function of mirror radius, to reshape the ferro-fluid mercury paraboloid into a sphere. Before giving details of the procedure, and the results of such determination, it is helpful to note certain important design considerations:

The rotation period T required to produce a paraboloid of focal length f is $$T = 2\pi \sqrt{2f/g} \quad (1)$$

If f=5.00 m, then T=6.35 s, close to 10 rpm. If z is the coordinate of the paraboloid axis, and r is the radial coordinate, the equation of the paraboloid is $$z = r^2/4f \quad (2)$$

It can be shown that a reasonable approximation to a spherical shape can be produced by the magnetic field of a single coil, provided that the desired sphere is tangent to the paraboloid at a radius $r_{TAN}$ approximately 20% larger than the mirror radius. The displacement, $\Delta z$, of the sphere above the original paraboloid, as a function of radial distance r, is then:

$$\Delta Z = \frac{1}{4f}(r_{TAN}^2 - r^2) + 2f - \sqrt{4f^2 + r_{TAN}^2 - r^2} \quad (3)$$

The sphere has a radius of curvature equal to $$R = \sqrt{4f^2 + r_{TAN}^2} \quad (4)$$

and this is 10.12 m in this example in which $r_{TAN}$=1.550 m. The displacement at r=0, the mirror center, is $\Delta z$=0.7130 mm.

The magnitude of the magnetic field just above the mercury surface, required to raise its height a distance $\Delta z$, is found by equating the incremental change in magnetic energy density in the ferro-fluid when the field is applied to the change in gravitational potential energy density. In S.I. units (Tesla, "T") the result is $$B = \sqrt{\frac{2\mu_0 \rho g \Delta z}{\mu_r - 1}} \quad (5)$$

where $\rho$ is the density of the mercury, and $\mu_r$ is its relative permeability. Assuming $\mu_r$=1.2, equation (5) shows that the necessary displacement of 0.713 mm at the center of the mirror requires a reasonable value of 0.0348 T for the central B-field.

One procedure for producing the correct radial dependence of the B-field magnitude, in order to convert the 2.65 m paraboloid into an accurate spherical shape, is as follows: using a suitable computational algorithm, based on the Biot-Savart law, calculate the Cartesian coordinate components produced by each element of each coil just above the required spherical surface, and compute the resultant net field magnitude. In this example one finds that a minimum of four coils are required in order to produce a surface accurate to better than a wavelength. The radius, distance below the center point of the original paraboloid, and current of each coil can be optimized using a combination of Monte Carlo and iteration techniques. A reasonable accurate initial approximation, which conserves computer time, is to treat each coil as if the cross section were of negligible diameter, but the final design requires proper modelling of the coil cross section shape.

Having produced an accurately spherical surface, it is now possible to design a telescope with a much wider field of view than is possible with a paraboloidal mirror. The reason for this is that a sphere has the same shape at every point, so that off-axis rays are focussed in the same manner as axial rays, which is not the case for a paraboloid. Although a spherical mirror introduces spherical aberration, this can be corrected in well known fashion using the telescope's secondary optics to obtain sharp focus; and, the central viewing angle can be shifted by changing the orientation of the secondary optics along the elevation and azimuth tracks shown in FIG. 1. In this example, a sky coverage of 20°×20° can be achieved, which compares very favourably to the ½°×½° possible with the natural paraboloid shape.

Figure 2:
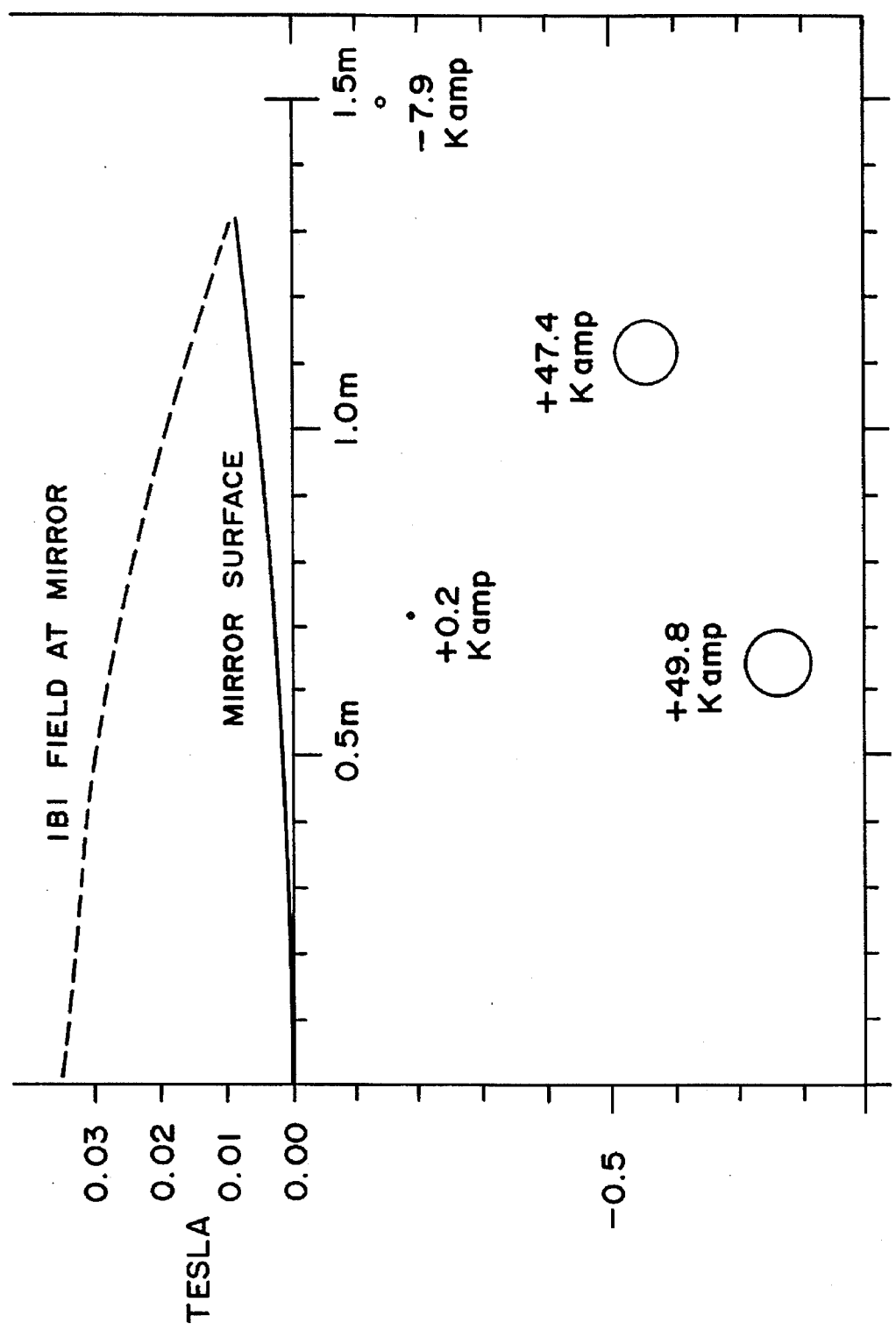
FIG. 2 is a vertical cross-section through the FIG. 1 telescope, showing the location and currents of the four coils, and the magnitude of the magnetic field that they produce just above a retro-fluid mercury mirror surface.

FIGS. 1 and 2 illustrate the resultant design in this embodiment. The four coils can convert the paraboloid into a sphere having a surface accuracy of ±100 nm. The required precision in the location of the coils is 1 mm, and the B-field is required to be precise to 4 μT. The electric power consumption by the coils is estimated to be about 25 kW, all of which are attainable. A cooling system (not shown) is required within the coils and insulation (not shown) is required around them to prevent the heat they develop from reaching the ferro-fluid mercury confined in rotatable container 20. Also, careful attention must be given to the magnetic environment, including a cancellation system for the horizontal component of the Earth's magnetic field. FIG. 1 shows an astronomical telescope design layout based on this preferred embodiment of the invention. In FIG. 2 the diameter of each of the four circles graphically represents the magnitude of the current flowing through the coil centred on that circle.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. In a controllable mirror comprising a reflective ferro-fluid surface and a container for confining said ferro-fluid, the improvement comprising means for generating a magnetic field having a predetermined spatial variation near said ferro-fluid surface, wherein:

(a) said magnetic field produces a force distribution which causes said ferro-fluid surface to acquire a predetermined, optically advantageous equilibrium shape determined in part by a gravitational field and further determined in part by rotation of said ferro-fluid within said gravitational field; and, (b) a natural parabolic shape resulting from said rotation within said gravitational field is converted to a spherical shape by selected alteration of said spatial variation of said magnetic field force distribution.

2. A controllable mirror as defined in claim 1, wherein said ferro-fluid is mercury containing a suspension of fine ferromagnetic particles.

* * * * *